Nov. 29, 1960    H. F. GREENE    2,962,289
PHONOGRAPHS
Filed Sept. 19, 1955    10 Sheets-Sheet 1

INVENTOR.
Hilliard F. Greene
BY Wallace and Cannon
ATTORNEYS

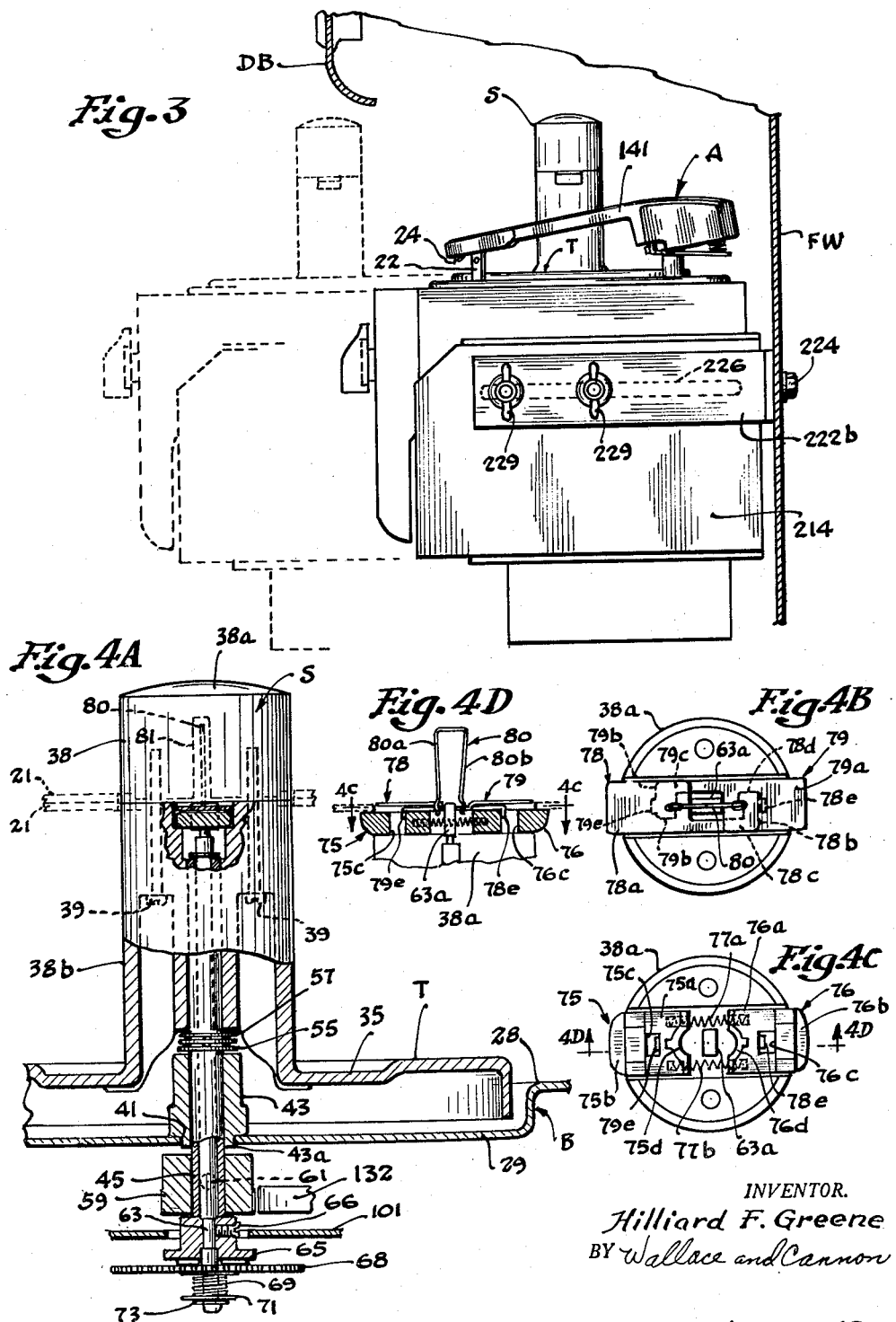

Nov. 29, 1960  H. F. GREENE  2,962,289
PHONOGRAPHS

Filed Sept. 19, 1955  10 Sheets-Sheet 3

INVENTOR.
Hilliard F. Greene
BY Wallace and Cannon
ATTORNEYS

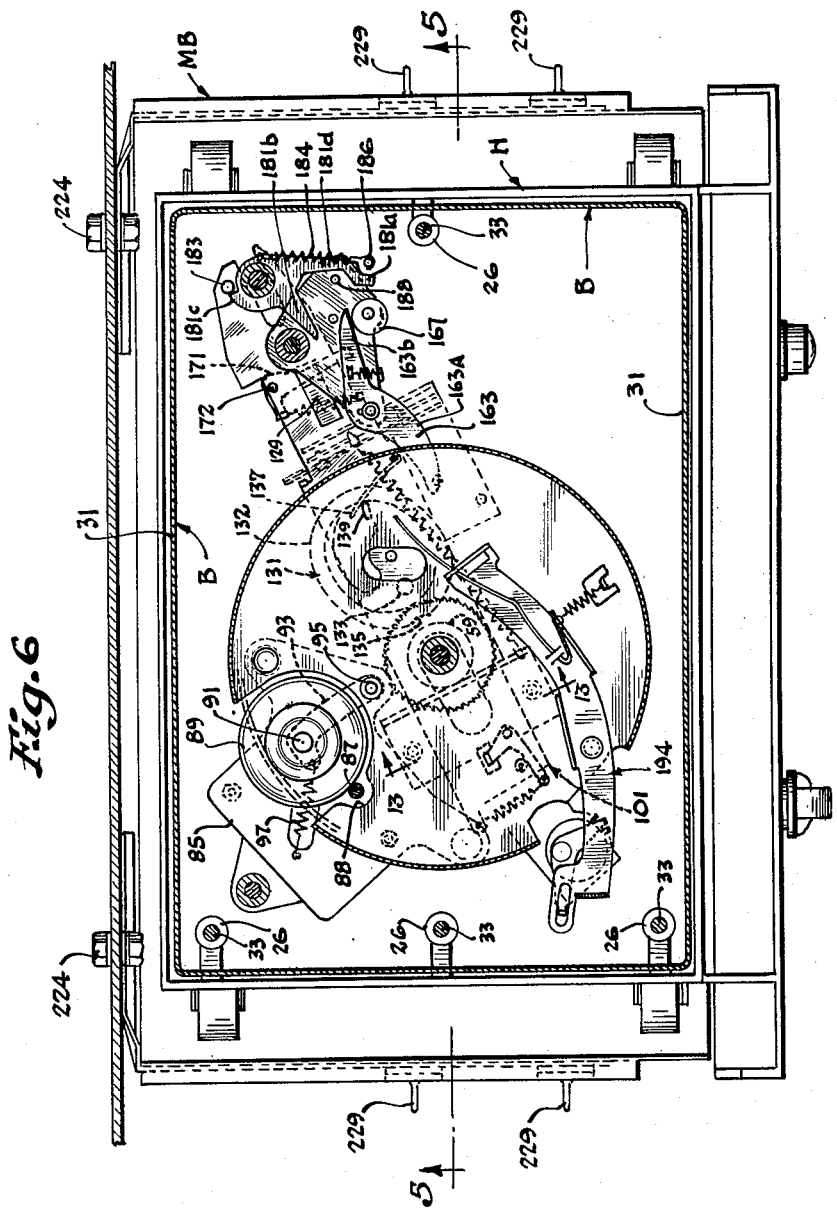

Nov. 29, 1960 H. F. GREENE 2,962,289
PHONOGRAPHS
Filed Sept. 19, 1955 10 Sheets-Sheet 5
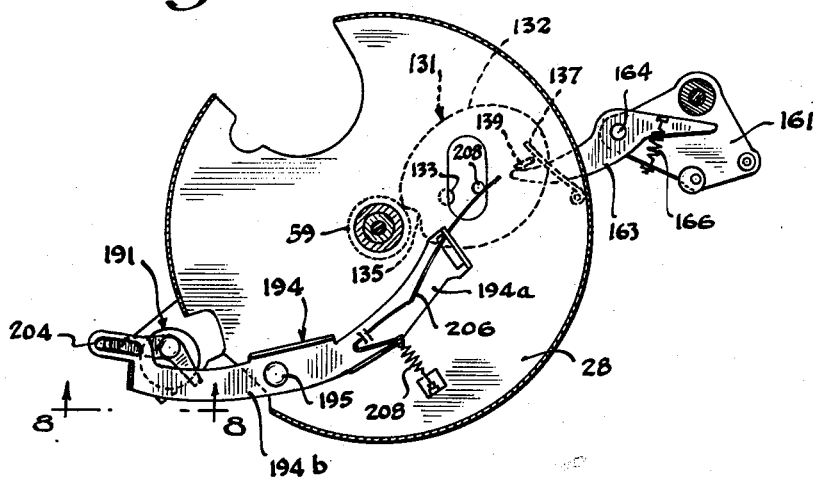
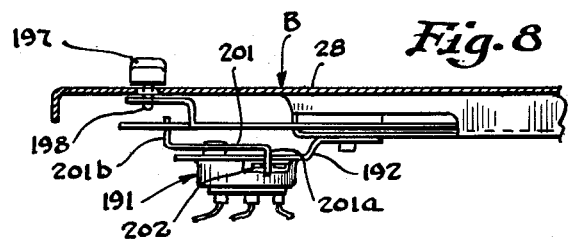
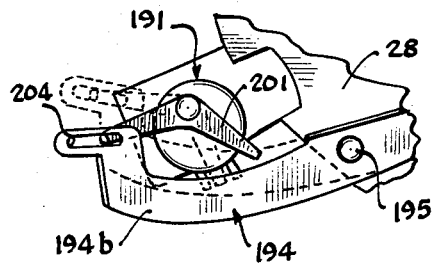
INVENTOR
*Hilliard F. Greene*
BY *Wallace and Cannon*
ATTORNEYS

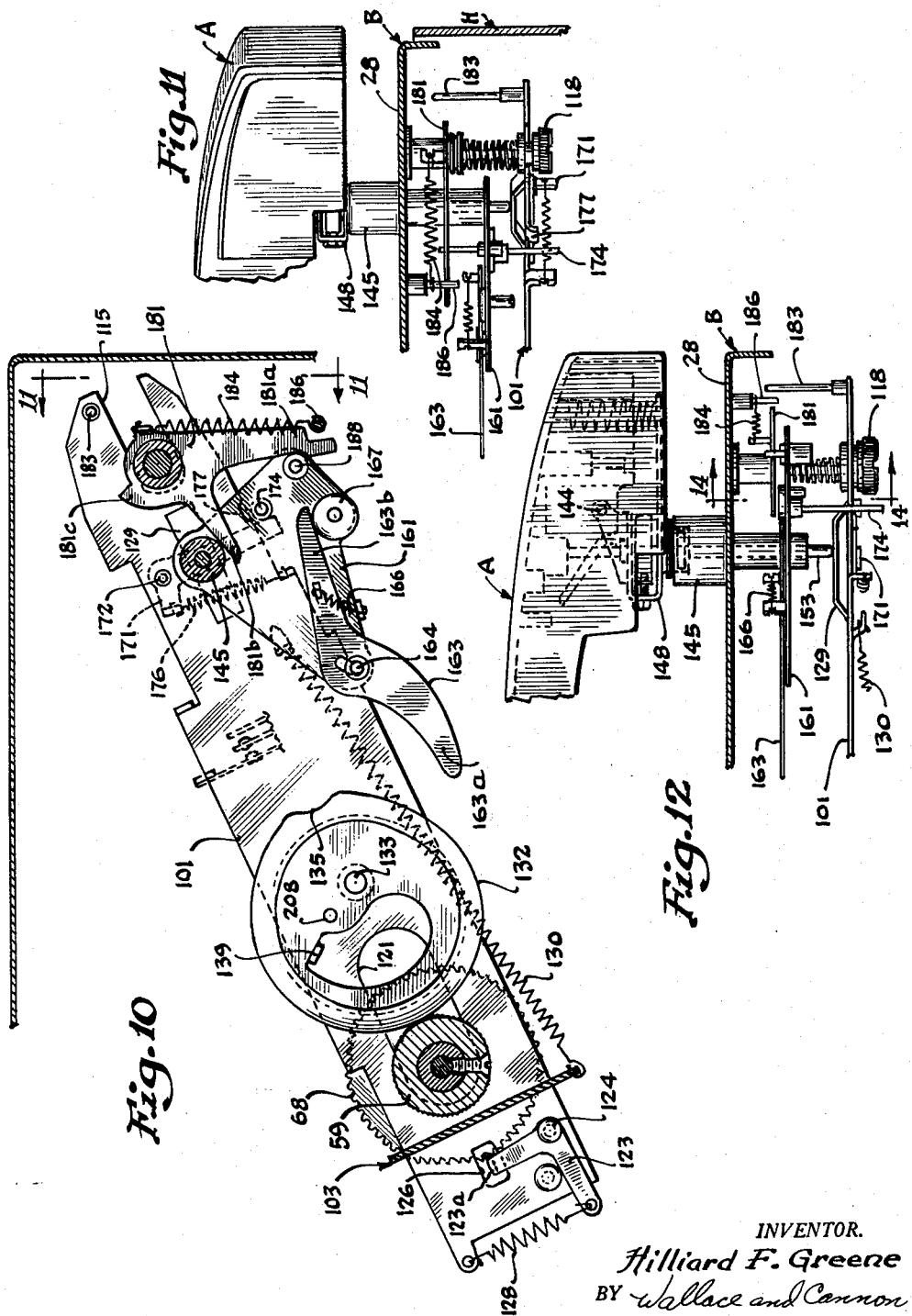

Nov. 29, 1960   H. F. GREENE   2,962,289
PHONOGRAPHS
Filed Sept. 19, 1955   10 Sheets-Sheet 7
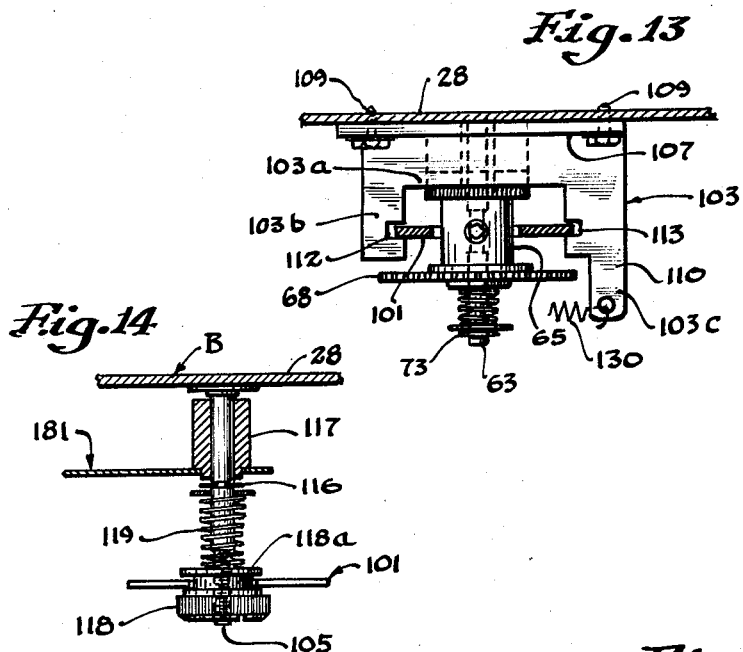
INVENTOR
Hilliard F. Greene
BY Wallace and Cannon
ATTORNEYS

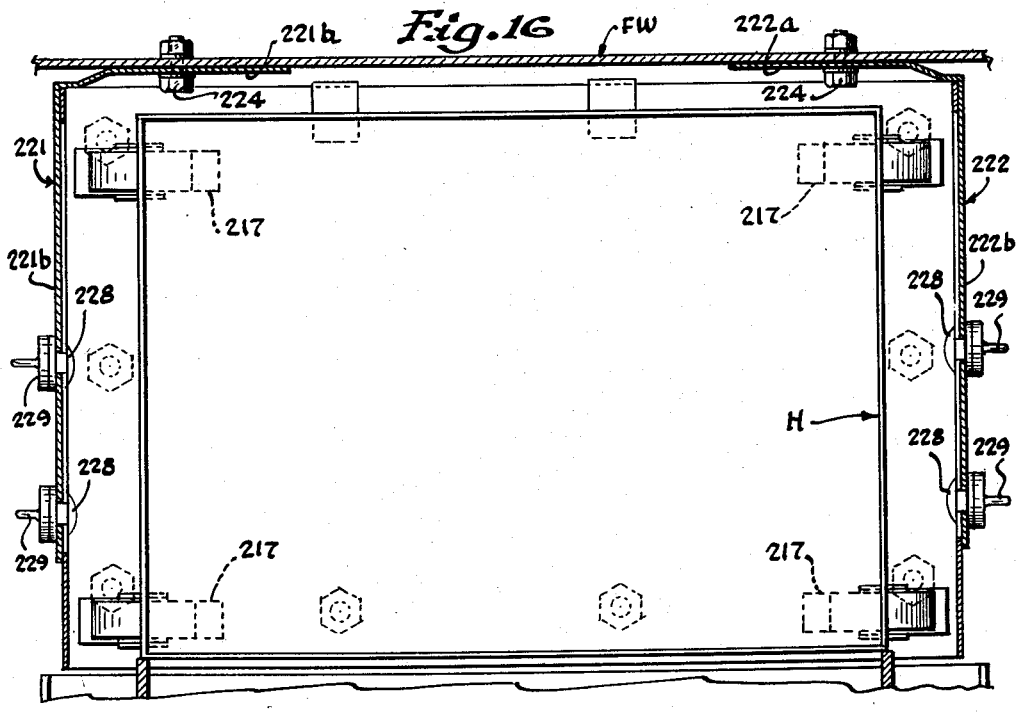
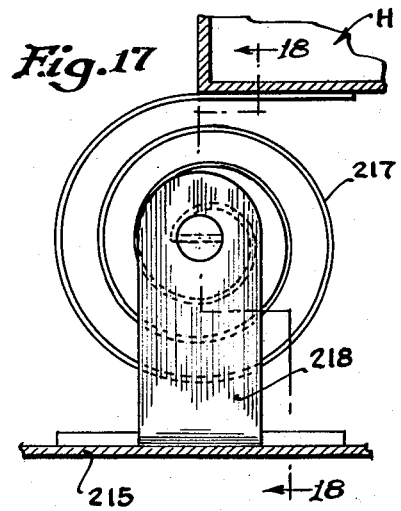
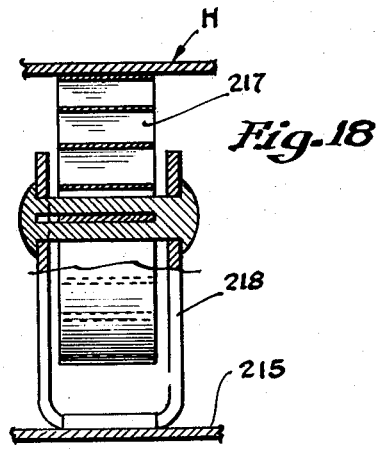

Nov. 29, 1960 H. F. GREENE 2,962,289
PHONOGRAPHS
Filed Sept. 19, 1955 10 Sheets-Sheet 9
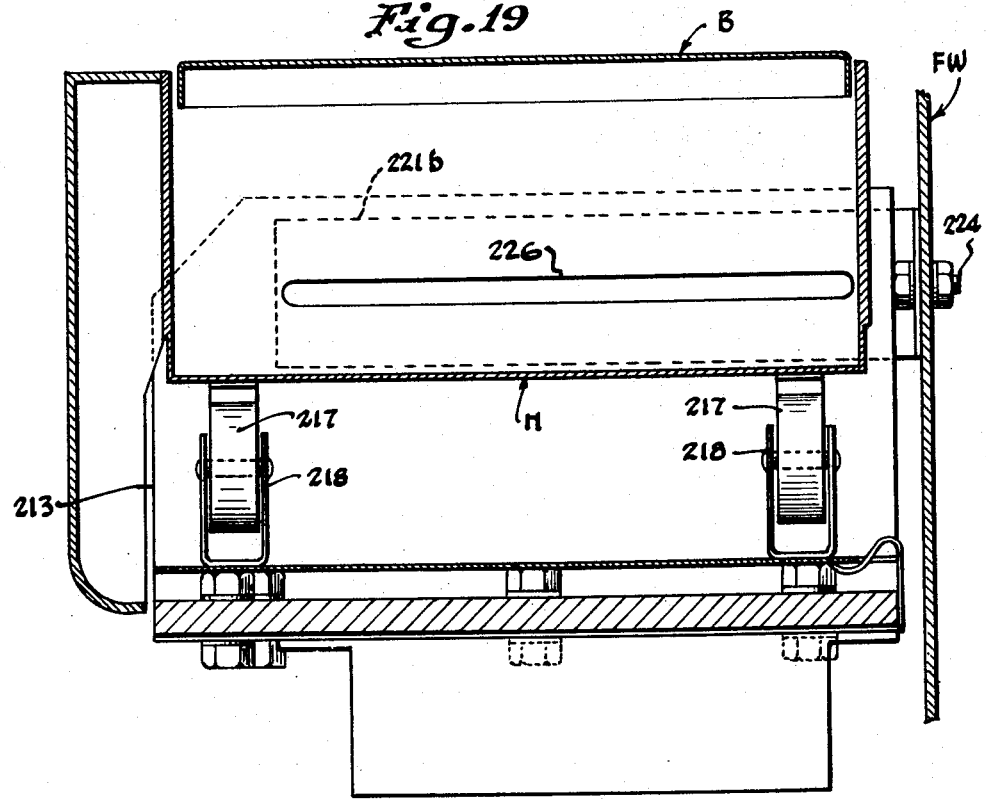
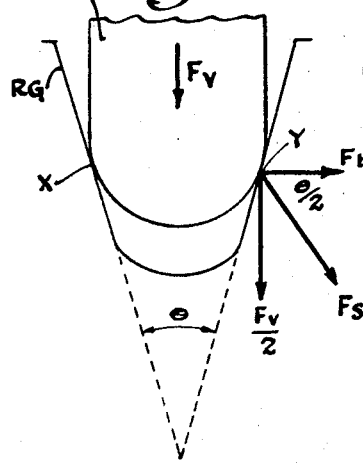
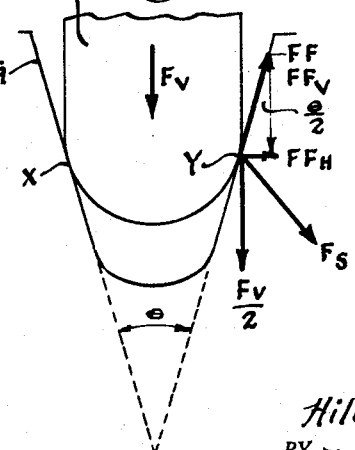
INVENTOR.
Hilliard F. Greene
BY Wallace and Cannon
ATTORNEYS Nov. 29, 1960      H. F. GREENE      2,962,289
PHONOGRAPHS
Filed Sept. 19, 1955      10 Sheets-Sheet 10
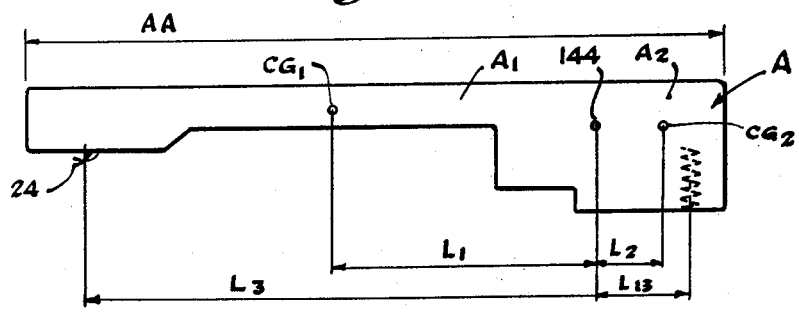
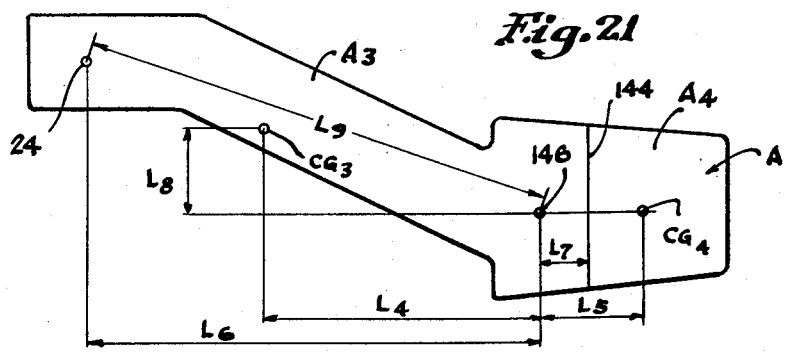
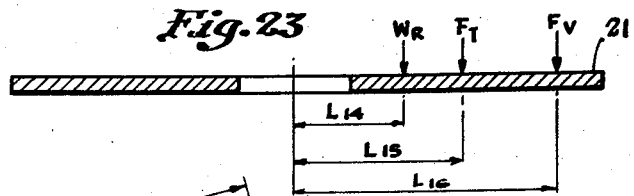
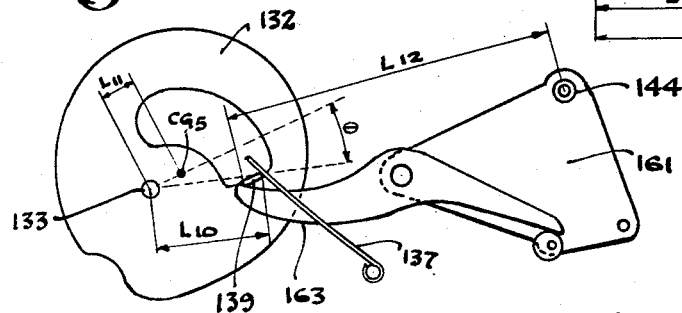
INVENTOR
Hilliard F. Greene
BY Wallace and Cannon
ATTORNEYS United States Patent Office 2,962,289
Patented Nov. 29, 1960

2,962,289

PHONOGRAPHS

Hilliard F. Greene, 1940 N. Nardica, Chicago, Ill.

Filed Sept. 19, 1955, Ser. No. 535,156

5 Claims. (Cl. 274—10)

This invention relates to phonographs, and, more particularly, to phonographs which are particularly well adapted for use in moving vehicles such as automobiles, trucks and the like.

It is a primary object of my invention to afford a novel phonograph which may be effectively used to play records in moving vehicles such as automobiles, trucks, and the like.

It is another object of my invention to afford a novel phonograph of the record changer type which will automatically and effectively play, in sequence, a plurality of records during normal travel of the vehicle in which the phonograph is mounted.

Another object of my invention is to provide a novel phonograph of the aforementioned type which is so constructed that the tone arm will remain in proper record-playing relation to a record which is being played during normal operation of a vehicle in which the phonograph is mounted.

A further object of my invention is to afford novel mounting for a record-playing tone arm in a vehicle such as an automobile, or the like.

Yet another object of my invention is to provide a novel phonograph of the aforementioned type which embodies novel mechanism constituted and arranged in a novel and expeditious manner for effectively holding the tone arm of the phonograph from being moved vertically or horizontally relative to a record being played by normal operation of the vehicle.

Another object of my invention is to afford a phonograph of the aforementioned type which embodies novel support and mounting for the record-player and record-changing mechanism.

Another object of my invention is to afford a novel record-player and record-changer of the aforementioned type which is capable of effectively playing records without wearing the record grooves or record-engaging needle an impractical amount.

A further object of my invention is to afford a phonograph of the aforementioned type which may be readily installed in either new vehicles when they are being produced or on vehicles which have alrealy been produced.

Another object of my invention is to provide a phonograph of the aforementioned type which is reliable in operation, is of a size and construction which may permit it to be effectively incorporated in automobiles, trucks, and the like, and which may be readily and economically produced commercially.

Other and further objects of the present invention will be apparent from the following description and claims and are illustrated in the accompanying drawings which, by way of illustration, show the preferred embodiment of the present invention and the principles thereof, and what I now consider to be the best mode in which I have contemplated applying these principles. Other embodiments of the invention embodying the same or equivalent principles may be used and structural changes may be made as desired by those skilled in the art without departing from the present invention.

In the drawings:

Fig. 3 is a side elevational view of the phonograph shown in Fig. 1;

Fig. 4A is a detail sectional view of a portion of the phonograph shown in Fig. 1;

Fig. 4B is a top plan view of the spindle shown in Fig. 4A with the top of the spindle removed to show the underlying parts;

Fig. 4C is a detail sectional view taken substantially along the line 4C—4C in Fig. 4D;

Fig. 4D is a detail sectional view taken substantially along the line 4D—4D in Fig. 4C;

Fig. 6 is a sectional view taken substantially along the line 6—6 in Fig. 5;

Fig. 7 is a detail sectional view somewhat similar to Fig. 6 but showing parts thereof disposed in different operative position;

Fig. 8 is a detail sectional view taken substantially along the line 8—8 in Fig. 7;

Fig. 9 is a detail top plan view of a portion of the mechanism shown in Fig. 8;

Fig. 10 is a sectional view somewhat similar to Fig. 6 but showing parts thereof in different operative positions;

Fig. 11 is a detail sectional view taken substantially along the line 11—11 in Fig. 10;

Fig. 12 is a detail sectional view taken substantially along the line 12—12 in Fig. 2;

Fig. 13 is a sectional view taken substantially along the line 13—13 in Fig. 6;

Fig. 14 is a detail sectional view of a portion of the mechanism shown in Fig. 5;

Fig. 15 is a detail sectional view taken substantially along the line 15—15 in Fig. 2;

Fig. 16 is a sectional view taken substantially along the line 16—16 in Fig. 5;

Fig. 17 is a detail sectional view of a portion of the mechanism shown in Fig. 5;

Fig. 18 is a detail sectional view taken substantially along the line 18—18 in Fig. 17;

Fig. 19 is a detail sectional view taken substantially along the line 19—19 in Fig. 5;

Fig. 20 is a diagrammatic side elevational view of the tone arm in the phonograph shown in Fig. 1;

Fig. 21 is a diagrammatic top plan view of the tone arm in the phonograph shown in Fig. 1;

Fig. 22 is a diagrammatic view of a portion of the mechanism shown in Fig. 6;

Fig. 23 is a diagrammatic view of certain forces applied to a record played in the phonograph shown in Fig. 1; and Figs. 24 and 25 are diagrammatic cross-sectional views of a record groove with a record-playing needle disposed therein.

Figure 1:
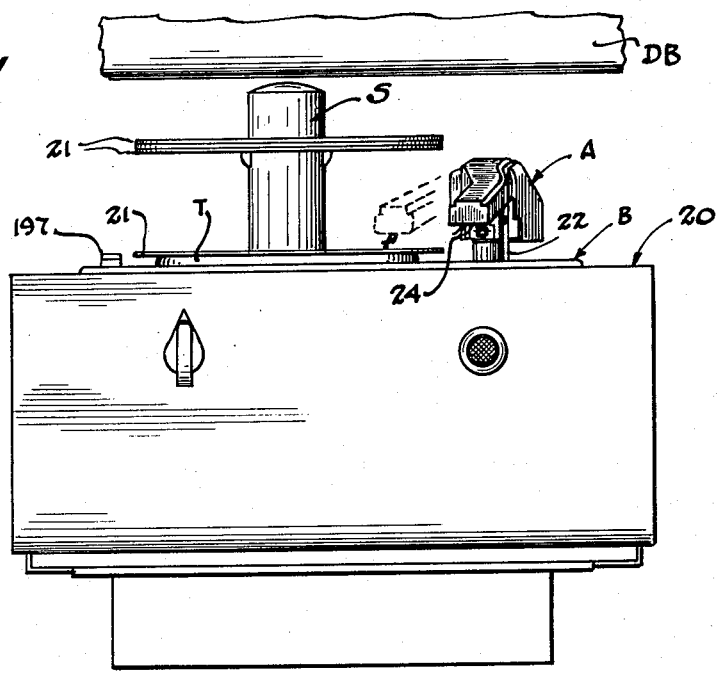
Fig. 1 is a front elevational view of a phonograph embodying the principles of my invention.

To illustrate the principles of my invention, a phonograph 20, comprising a preferred embodiment of my invention, is shown in the drawings. The phonograph 20, comprises, in general, Figs. 1, 2 and 5, a housing H in which is mounted a substantially rectangular shaped supporting base B. A turntable T, for the reception of records to be played, is rotatably mounted on the central portion of the base B and is connected to a drive mechanism D which includes a motor M. The drive mechanism D is also operatively connected to a record changing mechanism R which is operable to automatically drop records in sequence down a spindle S onto the turntable T, the spindle S being part of the record changing mechanism R as will be discussed in greater detail hereinafter.

A tone arm A is pivotally mounted on the base B in position wherein it may operatively engage a record, such as one of the records 21, Fig. 1, when the latter is mounted on the turntable T in record-playing position. When the tone arm A is mounted in non-record playing position or normal at rest position, it is disposed on a supporting bracket 22 in the position shown in solid lines in Figs. 1, 2 and 3. During a record playing operation, the tone arm is initially engaged with the outer peripheral edge of the record to be played, as shown in broken lines in Fig. 1, and is moved inwardly by the grooves RG in the record toward the spindle S. At the completion of the playing of a record, the needle 24 on the tone arm A engages the run-out portion of the grooves RG on the record being played and is moved inwardly toward the spindle S, as shown in broken lines in Fig. 2, a sufficient distance to cause the record changing mechanism R to be actuated to thereby lift the tone arm A upwardly and swing it back in raised position over the bracket 22. During this movement of the tone arm A the record changer mechanism is effective to drop the lowermost record of a stack of records mounted on the upper end portion of the spindle S onto the turntable T and, when the new record is disposed on the turntable T, the tone arm A is then automatically swung back into position over the outer peripheral edge of the new record and lowered back into record playing position wherein the needle 24 engages the outer peripheral edge of the record playing grooves RG in the new record 21, as will be discussed in greater detail presently.

Figure 5:
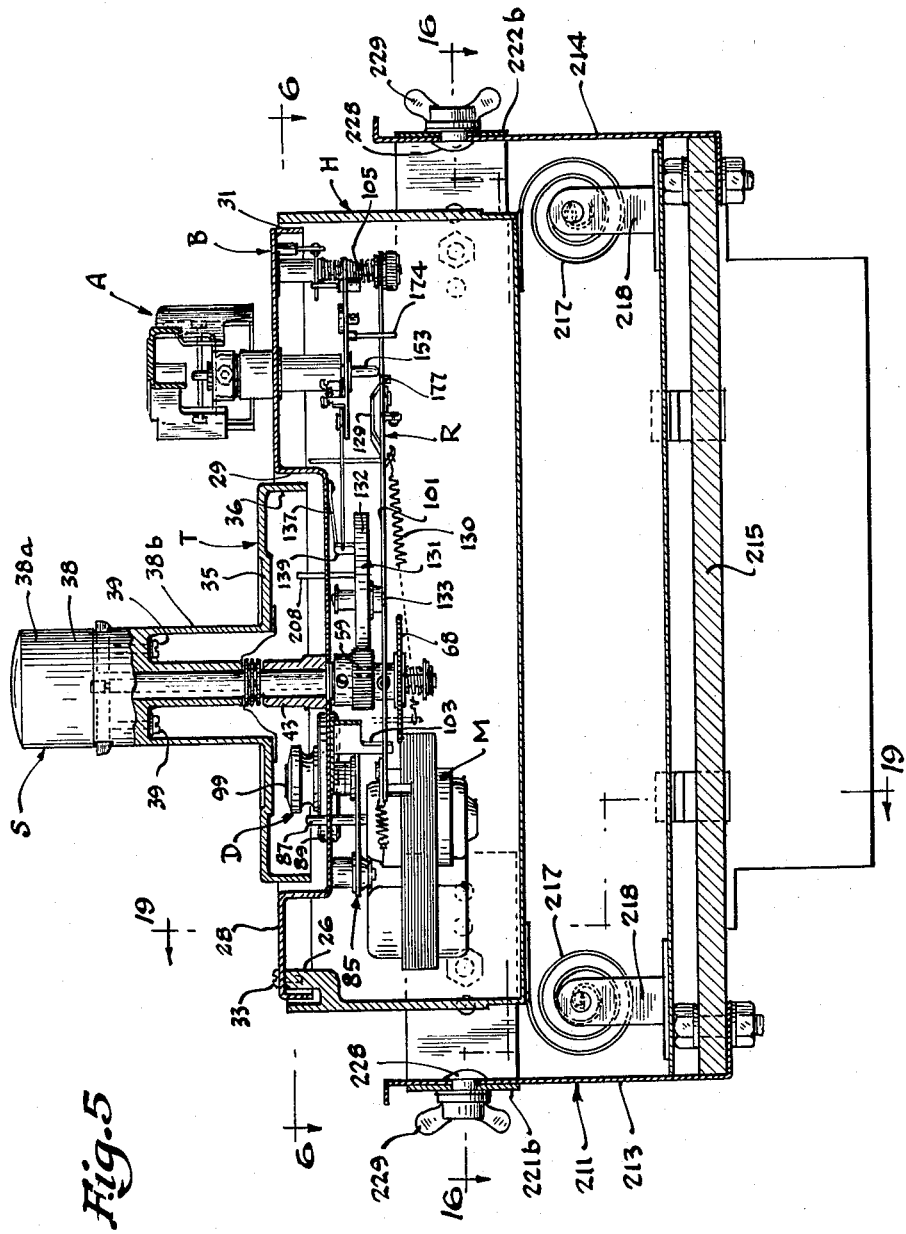
Fig. 5 is a sectional view taken substantially along the line 5—5 in Fig. 2.

The housing H may be made of any suitable material such, as, for example, a suitable phenol-formaldehyde resin and is preferably in the form of an open-topped rectangular shaped box, Figs. 5, 6 and 16. A plurality of bosses 26, Figs. 5 and 6, project inwardly from the upper edge portions of the side walls of the housing H for supporting the base B.

The base B may be made of any suitable material such, as, for example, sheet steel and has a substantially rectangular shaped top wall 28 having a substantially circular shaped recess 29 formed in the central portion thereof, Figs. 5 and 6. A flange 31 projects downwardly from the outer edges of the top wall 28, Fig. 5. The base B is mounted in the housing H, Figs. 5 and 6, with the lower face of the top wall 28 resting on the bosses 26, and with the flange 31 disposed closely adjacent, but in spaced relation, to the side walls of the housing H, Fig. 6. The base B is secured to the bosses 26 by suitable means such as screws or bolts 33, Figs. 2, 5 and 6.

The turntable T embodies a substantially circular, disk-shaped top wall 35 from the outer peripheral edge portion of which a substantially annular shaped flange 36 projects downwardly, Fig. 5. The spindle S is substantially cylindrical in shape and projects upwardly from the central portion of the top wall 35 of the turntable T. The spindle S embodies a substantially cylindrical shaped outer housing 38 which is preferably made in two parts, having an upper end portion 38a which is removably mounted on the lower end portion 38b, and is removably secured thereto by suitable means such as screws or bolts 39, Fig. 5. The lower end portion 38b of the spindle S may be made as an integral part of the turntable T, the housing 38 and the turntable T being made of any suitable material such, as, for example, a suitable phenol-formaldehyde resin.

An opening 41, Fig. 4A, is formed in the central portion of the depression 29 in the top wall 28 of the base B, Fig. 4A, and a hollow post 43 is mounted in upright position on the base B in axial alignment with the opening 41. The post 43 may be secured in such upright position on the base B by any suitable means such, as, for example, forming ears 43a on the lower end portion thereof, and which ears 43a may be projected downwardly through the opening 41 and crimped into tight clamping engagement with the portion of the top wall 28 adjacent to the opening 41, Fig. 4A.

A sleeve 45 is journalled in the post 43 and extends therethrough. The sleeve 45 extends upwardly through the lower end portion 38b of the housing 38 of the spindle S and is mounted therein with a force fit so that it is secured to the spindle S and the turntable T for rotation therewith.

A bearing 55 is mounted on the sleeve 45 and rests on the upper end of the sleeve 43. The lower end of the lower end portion 38b of the housing 38 of the spindle S is recessed to afford an inwardly disposed shoulder 57 which rests on, and is rotatably supported by, the bearing 55.

A knurled collar 59 is mounted on the lower end portion of the sleeve 45, and is secured thereto by suitable means such as a set screw 61, below the top wall 28 of the base B, Fig. 4A, and forms a part of the drive mechanism D for the record changer R as will be discussed in greater detail presently.

A shaft 63 is journalled in and extends through the sleeve 45, Fig. 4A. A collar 65 is mounted on the shaft 63 below the collar 59 on the sleeve 45, and is secured to the shaft 63 by a set screw 66. A gear wheel 68 is mounted on the shaft 63 with a relatively loose fit, below the collar 65 and is yieldingly held in frictional engagement with the lower face of the collar 65 by a compression coil spring 69 disposed around the lower end portion of the shaft 63 and resting on a plate 71 which is retained on the lower end of the shaft 63 by suitable means such as a clip 73.

A substantially rectangular-shaped recess 74, Figs. 4A and 4B, is formed in the upper end of the lower end portion 38b of the spindle housing 38, and extends diametrically thereacross in substantially perpendicular relation to the longitudinal axis of the shaft 63. Two substantially rectangular-shaped record supporting members 75 and 76, Figs. 4C and 4D, are slidably mounted in opposite end portions of the recess 74 for substantially horizontal reciprocation inwardly and outwardly therein toward and away from each other. Each of the members 75 and 76 embodies an inner end 75a and 76a, and an outer end 75b and 76b, respectively, and each has a substantially centrally disposed opening 75c and 76c, respectively, extending vertically therethrough, Figs. 4C and 4D. Two substantially parallel compression coil springs 77a and 77b are mounted in and extend horizontally between the inner ends 75a and 76a of the supporting members 75 and 76, and are normally effective to urge the supporting members 75 and 76 outwardly away from each other into position wherein the outer end portions 75b and 76b thereof project outwardly from the housing 38 to support a stack of records thereabove on the spindle S.

Two substantially rectangular-shaped auxiliary supporting members 78 and 79, Figs. 4B and 4D, are slidably mounted on top of the supporting members 75 and 76 in the recess 74. The auxiliary supporting members 78 and 79 each embody an outer end portion 78a and 79a slidably mounted on the outer end portion 75b and 76b of the supporting members 75 and 76, respectively, and a substantially L-shaped inner end portion 78b and 79b, respectively. Each of the end portions 78b and 79b embodies a side leg 78c and 79c, respectively, projecting inwardly along the recess 74 from one lateral side of the inner end of the outer end portion 78a and 79a, respectively, and a base leg 78d and 79d projecting laterally to the recess 74 inwardly over the supporting members 76 and 75, respectively. An ear 78e and 79e projects downwardly from the inner edge of the inner end portions 78b and 79b, respectively, into the openings 76c and 75c in the supporting members 76 and 75, respectively, Figs. 4C and 4D.

A substantially hairpin-shaped spring 80 is mounted in upright position on the auxiliary supporting members 78 and 79, with the closed end portion thereof projecting upwardy into a recess 81 formed in the upper end portion 38a of the spindle S. The free ends of the legs 80a and 80b of the spring 80 are hooked into the base legs 78d and 79d of the auxiliary supporting members 78 and 79, respectively, in position to urge the auxiliary members inwardly toward each other. The ears 78e and 79e are disposed in the openings 76c and 75c, respectively, in engagement with the inner edges thereof.

The shaft 63, which extends upwardly into the spindle housing 38 has a substantially rectangular-shaped head 63a formed on the upper end portion thereof. The head 63a is disposed between the inner ends of the supporting members 75 and 76 and the auxiliary supporting members 78 and 79, Figs. 4B and 4D. Normally, the head 63a is disposed in the spindle housing 38 with the longitudinal sides thereof projecting perpendicular to the length of the recess 74. In this position, the head 63a permits the auxiliary supporting members 78 and 79 to occupy their normal position wherein the outer ends thereof are disposed inwardly of the outer periphery of the housing 38 as shown in Fig. 4D. When the shaft 63 is rotated in the housing 38, by stopping rotation of the gear 68 and, therefore, of the shaft 63, while continuing the rotation of the turntable T and the housing 38, as will be discussed in greater detail hereinafter, the head 63a is moved into position in the housing 38 wherein the longitudinal sides thereof project longitudinally along the recess 74. In this position, the head 63a is disposed within recesses 75d and 76d in the inner ends of the supporting members 75 and 76, Fig. 4C, so that it remains out of engagement with the members 75 and 76. However, it does engage the inner edges of the outer end portions 78a and 79a of the auxiliary supporting members 78 and 79 and, therefore, is effective to cam the auxiliary supporting members 78 and 79 outwardly away from each other into outwardly projecting relation to the housing 38 of the spindle S. The ears 78e and 79e on the auxiliary members 78 and 79 are effective, during this outward movement of the latter, to pull the opposite supporting members 76 and 75, respectively, inwardly into position wherein the outer ends thereof are disposed inwardly of the outer periphery of the housing 38, to thereby permit the lowermost record 21 which was on the supporting members 75 and 76 to drop downwardly on the spindle S, while the remainder of the stack is supported by the now outwardly projecting auxiliary supporting members 78 and 79. As the head 63a returns to normal position in the housing 38, the spring 80 is effective to move the auxiliary supporting members 78 and 79 inwardly toward each other and, thereby, permit the supporting members 75 and 76 to be moved outwardly under the urging of the springs 77a and 77b. The movement of the supporting members 75 and 76 and the auxiliary supporting members 78 and 79 relative to each other is such that either the main supporting members 75 and 76 or the auxiliary supporting members 78 and 79 are always projecting outwardly into record supporting position, so that only one record may be dropped down the spindle S during one complete actuation of the members 75, 76, 78 and 79.

The drive mechanism D embodies an electric motor M which is mounted by a mounting bracket 85 on the lower face of the top wall 28 of the base B, Fig. 5. The drive shaft 87 of the motor M projects upwardly through an opening 88 in the top wall 28 within the recess 29 and is frictionally engaged with the peripheral edge of a wheel 89 rotatably mounted by a pin 91 on one end portion of a lever 93, Figs. 5 and 6. The other end portion of the lever 93 is pivotally mounted by a pin 95 on the upper face of the mounting bracket 85, and a tension coil spring 97 is secured to the lever 93 and the mounting bracket 85 in position to yieldingly hold the peripheral edge of the wheel 89 into frictional engagement with the periphery of the drive shaft 87. The periphery of the wheel 89 is preferably coated with a suitable material such as, for example, rubber so as to afford relatively quiet, good frictional engagement of the wheel 89 with the drive shaft 87.

Figure 2:
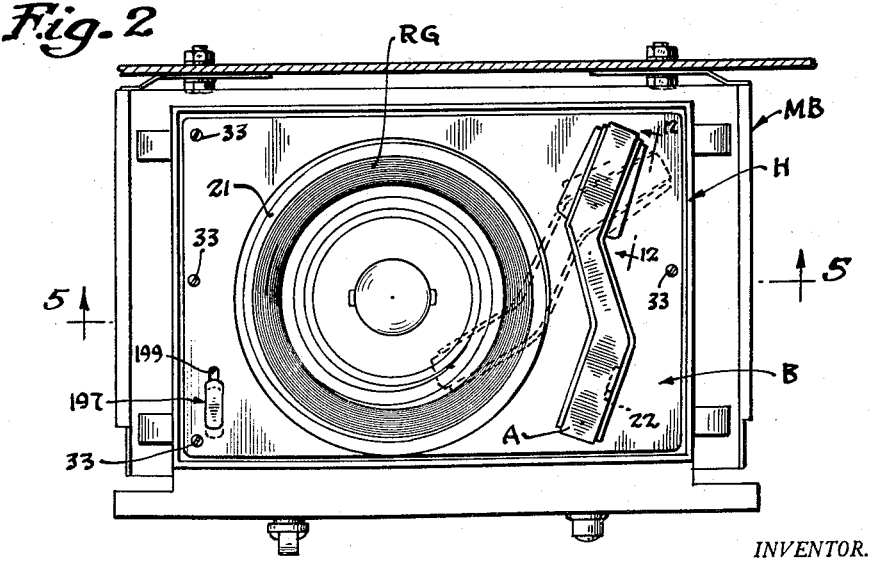
Fig. 2 is a top plan view of the phonograph shown in Fig. 1.

A hub 99 projects upwardly from the radially central portion of the wheel 89, and the peripheral edge portion thereof is normally disposed in frictional engagement with the inner face of the flange 36 of the turntable T, Figs. 5 and 6, so that upon rotation of the drive shaft 87 and the wheel 89 by the motor M, the hub 99 is effective, through its frictional engagement with the flange 36 of the turntable T, to rotate the turntable T and the spindle S in a clockwise direction as viewed in Fig. 2. Like the wheel 89, the peripheral edge of the hub 99 is preferably coated with a suitable material such, as, for example, rubber so as to afford a quiet, good frictional engagement with the inner face of the flange 36 of the turntable T.

The record changing mechanism R includes an elongated slide 101 which is slidably mounted on a bracket 103 and a bolt 105, Figs. 5, 6, 13 and 14. The bracket 103, Fig. 13, has a substantially horizontally disposed leg 107 secured in juxtaposition to the lower face of the top wall 28 of the base B by suitable means such as bolts 109. Another leg 110 projects downwardly from the leg 107 of the bracket 103 and is of substantially inverted U-shape, embodying an upper cross-bar 103a and two spaced parallel legs 103b and 103c. The legs 103b and 103c have notches or recesses 112 and 113 formed in the inner edge portions thereof, respectively, and the lateral edges of one end portion of the slide 101 are disposed in the notches 112 and 113 for longitudinal reciprocation therethrough. A longitudinally outwardly opening, elongated slot 115 is formed in the other end portion of the slide 101 and the bolt 105 extends downwardly therethrough. The bolt 105 is mounted on the base B and depends from the lower face thereof. The bolt 105 has an abutment member 116 thereon, and a nut 118 is mounted on the lower end portion of the bolt 105, with a compression coil spring 119 mounted on the bolt 105 between the abutment member 116 and the nut 118 to provide a holding device for preventing the nut 118 from loosening on the bolt 105. A sleeve 117 is rotatably mounted on the bolt 105 between the abutment member 116 and the top wall 28 of the base B.

The nut 118 has an annular groove 118a extending therearound, and the portions of the slide 101 defining the opposite longitudinal edges of the slot 115 are slidably mounted in the groove 118a. With this construction, it will be seen that the end of the slide 101 embodying the slot 115 may be raised or lowered around the other end thereof by raising or lowering the nut 118 on the bolt 105 to thereby adjust the position of the slide relative to the top wall 28 of the base B.

An elongated hole 121, Fig. 10, is formed in the slide 101 between the opposite ends thereof, in longitudinal extending relation to the longitudinal center line of the slide 101. The collar 65 is disposed in the slot 121, Figs. 4A and 6, and the slot 121 is of such length that the slide 101 may be moved through a complete reciprocation during the operation of the record changing mechanism R without the ends of the slot 121 striking the collar 65.

As is best seen in Figs. 4A and 13, the slide 101 is disposed in substantially horizontally extending relation above the horizontally extending gear wheel 68. A pawl 123, Fig. 10, is pivotally mounted on a pin 124 on the upper face of the slide 101 outwardly of the bracket 103. An opening 126 is formed in the slide 101 and a finger 123a, Figs. 5 and 10, on the pawl 123 projects downwardly through the opening 126 into position to be moved into and out of engagement with the teeth on the gear 68 during reciprocation of the slide 101, as will be discussed in greater detail presently. A tension coil spring 128 is connected between the pawl 123 and the slide 101 in such position as to urge the pawl 123 to pivot on the pin 124 in a direction to urge the finger 123a toward engagement with the gear 68, Fig. 10.

An elongated upwardly projecting cam plate 129 is struck upwardly from the longitudinal center portion of the slide 101 adjacent to the inner end portion of the slot 115, Figs. 5 and 10, for a purpose to be discussed in greater detail presently. A tension coil spring 130 is connected between the bracket 103 and the slide 101, Figs. 10 and 12, and is effective to urge the slide 101 toward the left as viewed in Fig. 10 toward normal at rest position as shown in Fig. 6.

An eccentric 131 in the form of a wheel 132 eccentrically mounted on a pin 133 is mounted on the slide 101 by the pin 133, Figs. 5 and 6. The periphery of the wheel 132 has a recess 135 formed therein which is in the shape of an arc of a circle having a somewhat larger radius than the periphery of the knurled collar 59. When the slide 101 is disposed in normal, at rest position, as shown in Fig. 6, the recess 135 is disposed in spaced parallel relation to the adjacent portion of the periphery of the collar 59, with the radial centers of the recess 135 and the periphery of the collar 59 preferably being identical. In this position, the collar 59 is ineffective to drive the eccentric wheel 132. However, if, while the collar 59 is rotating with the turntable T in a clockwise direction as viewed in Fig. 6, the eccentric 131 is rotated around the pin 133 in a counterclockwise direction into position wherein the trailing end of the arc 135 is engaged with the periphery of the collar 59, as shown in Fig. 7, the frictional engagement between the collar 59 and the periphery of the wheel 132 is effective to rotate the wheel 132 in a counterclockwise direction as viewed in Fig. 6 around the pin 133.

The pin 133 is so disposed on the wheel 132 that during the initial rotation of the wheel 132, until half of the rotation of the wheel 132 is completed, the pressure of the wheel 132 against the collar 59 causes the slide 101 to slide to the right as viewed in Fig. 6 on the bracket 103 and the bolt 105 from the position shown in Fig. 6 to the position shown in Fig. 10. This movement of the slide 101 is against the urging of the spring 130. During the last half of the single rotation of the wheel 132, engagement of the periphery of the wheel 132 with the collar 59 permits the slide to move to the left as viewed in Fig. 6 from the position shown in Fig. 10 to the position shown in Fig. 6, under the urging of the spring 130. At the completion of a single rotation of the wheel 132, the wheel 132 is so disposed on the pin 133 that the recess 135 is again disposed in spaced parallel relation to the collar 59 and rotation of the wheel 132 and, therefore, reciprocation of the slide 101 is stopped.

An elongated leaf spring 137, Figs. 5 and 6, made of any suitable material such, as, for example, spring steel wire, is attached at one end to the lower face of the top wall 28 of the base B by any suitable means such, as, for example, welding. The spring 137 is so disposed on the top wall 28 that the other end portion thereof projects downwardly toward the wheel 132. This latter end of the spring 137 is disposed in position to engage the ear 139 when the recess 135 is disposed in the aforementioned spaced parallel relation to the collar 59 and thereby stop the wheel 132 at the completion of one rotation. The spring 137 is of such strength and so engages the ear 139 as to be effective to prevent the wheel 132 from being rotated in a counterclockwise direction, as viewed in Fig. 6, by vibrations or other external forces applied to the phonograph 20 by normal driving conditions, a distance sufficient to cause the trailing edge of the recess 135 to engage the periphery of the collar 59. Hence, my novel phonograph 20 is protected against the initiation of a record changing cycle of operation by forces applied thereto caused by movements, vibrations, changes of direction, and the like, of the automobile, or the like in which it is mounted, under normal driving conditions.

In order to initiate a reciprocation of the slide 101, during a record changing cycle of operation of my novel phonograph 20, the eccentric 131 must be rotated in a counterclockwise direction, as viewed in Fig. 6, against the urging of the spring 137 as will be discussed in greater detail presently.

The tone arm A embodies an elongated body member 141, Figs. 2, 3, 12 and 15 with the needle 24 disposed in the end portion hereinafter referred to as the "front" end portion, Fig. 3. The main body portion 141 is preferably of a substantially inverted U-shaped cross-section and may be made of any suitable material such, as, for example, a suitable phenol-formaldehyde resin. A counter-weight 142 having two forwardly projecting, substantially parallel, horizontally spaced ears 143 is mounted in the rear end portion of the body member 141. A pivot pin 144 extends between the ears in a horizontal direction substantially perpendicular to the length of the body member 141.

A post 145 is mounted in the top wall 28 of the base B with a force fit, and extends therethrough in substantially upright position, Fig. 15. A sleeve 146 is rotatably mounted in the post 145 and extends a short distance above and below the latter. A collar 147 is mounted on the upper end portion of the sleeve 146 above the post 145 with a force fit and is rotatable therewith. A substantially U-shaped bracket 148 having two outer legs 148a and 148b interconnected by an intermediate leg 148c, is mounted on the sleeve 146 with the leg 148b disposed below the collar 147, and the leg 148a disposed above the collar 147. The bracket 148 may be secured to the sleeve for rotation therewith in a horizontal direction by any suitable means such, as, for example, a set screw 149 extending through the intermediate leg 148c into engagement with the collar 147.

The lower leg 148b of the bracket 148 is somewhat longer than the other outer leg 148a, Fig. 15, and is disposed in substantially horizontally extending position on the sleeve 146. The upper outer leg 148a of the bracket 148 has two ears 151 projecting upwardly and rearwardly therefrom, Fig. 15, in substantially parallel horizontally spaced relation to each other. The ears 151 are disposed between the ears 143 on the counterweight 142, in such position that the horizontal pivot pin 144 extends therethrough to thereby pivotally support the body member 141 of the tone arm A for pivotal movement in a vertical direction around the horizontally disposed pivot pin 144.

The lower leg 148b of the bracket 148 rests on the top end of the post 145 to thereby support the body member 141 of the tone arm A thereon. It will be remembered that the sleeve 146 is rotatable in the post 145, and that the bracket 148 is secured thereto. Hence, the body member 141 of the tone arm A is rotatably mounted on the post 145 for rotation in a horizontal direction around the longitudinal center line of the sleeve 146.

A substantially, straight elongated pin 153 extends through, and is slidably mounted in the sleve 146 for vertical reciprocation therethrough. The pin normally rests on the top face of the slide 101 in spaced relation to the cam 129 as shown in broken lines in Fig. 15. In this position the top of the pin is disposed out of engagement with the body portion 141 of the tone arm A, so that the tone arm A is free to be disposed in record-engaging position as shown in broken lines in Fig. 15. When the slide 101 is moved to the right by the rotation of the eccentric wheel 132, the pin 153 rides up onto the cam 129 and is raised thereby, to thereby lift the front end portion of tone arm A around the horizontal pivot 144 into position wherein it is disposed out of record-engaging position, as shown in solid lines in Fig. 15.

Upon movement of the slide 101 back to the right as viewed in Fig. 15, the cam 129 is again moved out from under the pin 153 so that the latter moves back down into engagement with the upper face of the slide 101 to thereby permit the tone arm A to rotate around the pivot 144 from raised position back down into record-engaging position. This raising and lowering of the tone arm A occurs during record-changing cycles of operation as will be discussed presently.

A compression coil spring 155 is mounted on the rear end portion of the leg 148b of the bracket 148 and extends upwardly into the counter-weight 142 in position to always urge the tone arm A to rotate in a counter-clockwise direction as viewed in Fig. 15, around the horizontal pivot 144.

A substantially triangular shaped lever 161, Figs. 6, 10, 12 and 15, is mounted on the lower end portion of the sleeve 146 in juxtaposition to the lower end of the post 145. The lever 161 is firmly secured at one corner to the sleeve 146 for rotation therewith. Another corner of the substantially triangular-shaped lever 161, has a pin 164 mounted therein in substantially vertical position, and this latter corner projects from the sleeve 146 in the general direction of the eccentric 131, Figs. 6 and 10.

An elongated lever 163 is pivotally mounted at its mid-portion on the upper face of the lever 161 by the pin 164, Figs. 6 and 10. The lever 163 has one end portion 163a projecting outwardly from the lever 161, and another leg 163b disposed in closely overlying parallel relation to the lever 161. A tension coil spring 166 is connected to the lever 161 and the legs 163b of the lever 163 in such position as to yieldingly urge the lever 163 to rotate in a clockwise direction as viewed in Figs. 6 and 10 around the pin 164. A stop 167 is mounted on the upper face of the lever 161 in position to engage the leg 163b of the lever 163 in such position as to limit rotation of the lever 163 on the lever 161 in a clockwise direction, as viewed in Fig. 10, to a position wherein the leg 163a of the lever 163 projects outwardly from the lever 161 substantially in alignment with the line running between the longitudinal axis of the pin 164 and the axis of the sleeve 146, Fig. 6.

The lever 161 is so disposed on the sleeve 146, and the lever 163 is so disposed on the lever 161 that as the needle 24 on the tone arm A moves inwardly along the record-playing grooves of a record being played on the turntable T, the free end portion of the leg 163a of the lever 163 is swung by the lever 161, turning with the sleeve 146, from the position shown in Fig. 6 toward engagement with the ear 139 on the wheel 132 of the eccentric 131. When the needle 24 on the tone arm A engages the run-out grooves on the record being played, the free end portion of the leg 163a of the lever 163 is moved firmly into engagement with the ear 139 and with sufficient force to overcome the spring 137 and thereby causes the wheel 132 to rotate in a counterclockwise direction as viewed in Fig. 6 from the position shown in Fig. 6 to the position shown in Fig. 7 and thereby causes the trailing edge of the recess 135 to engage the collar 59 which is rotating with the turntable T. This engagement of the trailing edge of the recess 135 causes a complete rotation of the wheel 132 around the pin 133 and thereby causes a reciprocation of the slide 101 as previously discussed.

The spring 166 is of sufficient strength that it holds the leg 163b of the lever 163 toward the stop 167 with sufficient force to overcome the spring 137, in moving the ear 139 in a counterclockwise direction as viewed in Fig. 6, but still affords a quietly operating yielding mechanism for engaging the trailing edge of the arc 135 with the periphery of the collar 59.

When the engagement of the trailing edge of the recess 135 with the collar 59 is effected by movement of the tone arm A onto the run-out grooves of the record being played, the tone arm is disposed in the position shown in broken lines in Fig. 2, the levers 161 and 163 are disposed in a position such as shown in Fig. 7, and the slide 101 is disposed in normal at-rest position shown in Fig. 6.

During the movement of the slide 101 to the right as viewed in Fig. 6, by the rotation of the eccentric 131, the tone arm A is first lifted from the record, the playing of which has just been completed, and the tone arm is swung outwardly past the outer peripheral edge of the record. The raising of the tone arm A from the record is effected by the cam 129 moving under the pin 153 and causing the same to be raised through the sleeve 146 to thereby press upwardly on the body portion 141 of the tone arm A forwardly of the pivot pin 144. Shortly after the pin 153 is disposed on the upper face of the cam 129, the outer end portion of a lever 171, Figs. 6, 10 and 12, pivotally mounted by a pin 172 on the lower face of the slide 101, engages a pin 174 projecting downwardly from the lever 161. A spring 176 is connected to the lever 171 in position to yieldingly urge the lever 171 to rotate in a counterclockwise direction, as viewed in Fig. 10, and a stop 177 projects downwardly from the slide 101 to limit rotation of the lever 171 in such direction. When the outer end portion of the lever 171 engages the pin 174, during movement of the slide 101 to the left, it is effective to yieldingly swing the lever 161 in a counter-clockwise direction as viewed in Fig. 10 to thereby swing the levers 161 and 163 from the position shown in Fig. 7 to the position shown in Fig. 10. This movement of the lever 161 is effective to rotate the sleeve 146 in the post 145 to thereby cause the tone arm A to be swung outwardly from the position shown in broken lines in Fig. 2 to the position shown in solid lines in Fig. 2.

A lever 181, Figs. 5, 6, 10 and 14, having three legs, 181a, 181b and 181c is pivotally mounted on the sleeve 117 for rotation therewith in a substantially horizontal direction. A pin 183 is mounted on and projects upwardly from the end of the slide 101 adjacent to the recess 115, Figs. 6 and 10, and when the slide 101 is disposed in normal at-rest position, the leg 181c of the lever 181 is normally disposed in abutting engagement with the upper end portion of the pin 183, as shown in Fig. 6. A tension coil spring 184 is connected between the lever 181 and a pin 186, projecting downwardly from the top wall 28 of the base B, in position to normally urge the leg 181c toward such engagement with the pin 183. During the initial movement of the slide 101 to the right as viewed in Fig. 6, the pin 183 is moved out of engagement with the leg 181c to thereby free the lever 181 for rotation in a clockwise direction as viewed in Fig. 6 by the spring 184. This rotation of the lever 181 is effective to carry the leg 181b into engagement with the lower end portion of the post 145 to thereby prevent further rotation of the lever 181 in this direction.

A pin 188 is mounted on and projects upwardly from the lever 161 in such position that when the lever 181 is disposed with the leg 181b in engagement with the post 145, and the lever 161 is rotated in a counterclockwise direction by movement of the slide 101 to the right as viewed in Fig. 6, as previously described, the pin 188 engages the leg 181a of the lever 181 and rides inwardly therealong into a recess 181d formed therein. The recess 181d is so disposed in the leg 181a of the lever 181 that in riding thereinto, the pin 188 first rotates the leg 181b in a counterclockwise direction as viewed in Fig. 6 against the urging of the spring 184 and, as the pin 188 moves along the leg 181a into position wherein it is in alignment with the recess 181d, the spring 184 then rotates the lever 181 in a clockwise direction so that the pin 188 is yieldingly latched in the recess 181d.

As the slide 101 starts to move back to the left as viewed in Fig. 6, the lever 171 is moved to the left therewith in a direction away from engagement with the pin 174. This permits the lever 161 to be rotated by the lever 181 in a clockwise direction, as viewed in Fig. 10, the spring 184 causing the lever 181 to rotate in a clockwise direction as viewed in Fig. 10, toward the position shown in Fig. 6. When the lever 181 is disposed in the latter position, the leg 181b is again disposed in abutting engagement with the post 145 to thereby prevent further clockwise rotation of the lever 181. At that time, the pin 188 is still disposed in the recess 181d, and the engagement of the pin 188 in the recess 181d is such as to prevent further clockwise rotation of the lever 161 and, therefore, of the tone arm A, while the pin 188 remains in engagement in the recess 181d. The lever 181 is so disposed on the sleeve 117 that this engagement of the pin 188 in the recess 181d is effective to index the positioning of the tone arm so that the tone arm A is stopped in such position that the needle 24 is disposed over the lead-in grooves of the next record to be played on the turntable T.

Continued movement of the slide 101 to the left as viewed in Fig. 6, moves the cam 129 to the left out of engagement with the pin 153 to thereby permit the pin 153 to drop down onto the upper face of the main body portion of the slide 101 and permit the front end portion of the tone arm A to swing downwardly into such position that the needle 24 is engaged with the lead-in grooves of the record to be played. At the same time, the movement of the slide 101 to the left is effective to move the pin 183 thereon into engagement with the leg 181c of the lever 181, and thereby pivot the lever 181 in a counterclockwise direction, to thereby move the leg 181a thereof out of engagement with the pin 188 on the lever 161 and free the lever 161 for rotation in a clockwise direction as viewed in Fig. 6. This freeing of the lever 161, frees the tone arm A so that it is then free to move inwardly across the record to be played as the needle 24 moves in the record playing groove.

While the tone arm was being picked up from the record, the playing of which was completed, swung outwardly, and then swung back inwardly into record playing position, and lowered on to the next record to be played, by the reciprocation of the slide 101, the record changing mechanism R was also actuated to drop another record from the spindle S onto the turntable T. In so actuating the record changing mechanism, the ear 123a on the lever 123 was first moved by the movement of the slide 101 to the right, into engagement with a tooth on the gear 68 to thereby stop rotation of the collar 65 and the pin 63. Although the pin 63 was stopped, the turntable T and, therefore, the collar 59 and the sleeve 45 continued to be rotated by the motor M. This caused the auxiliary supporting members 78 and 79 to be reciprocated outwardly and inwardly in the spindle housing 38 while the supporting members 75 and 76 were reciprocated inwardly and outwardly to thereby drop the lowermost record of the stack of records 21, disposed on the upper end portion 38a of the spindle housing 38, downwardly onto the turntable T.

As the slide 101 moved to the left, in the latter stages of the record changing cycle of operation, the ear 123a was moved out of engagement with the gear 69 to thereby free the gear 69 and the shaft 63 for normal rotation with the turntable T and the spindle S. The ear 123a is held by the slide 101 in engagement with the gear 69 only through one-half of a rotation of the turntable T. Hence, only one record is dropped down the spindle S during one record changing cycle of operation.

The tone arm A embodies the usual cartridge, not shown, disposed in the forward end portion of the body member 141, and the needle 24 projects downwardly therefrom, Fig. 15. Suitable wires, not shown, lead from the cartridge and may be connected to a suitable amplifier system such as, for example, the amplifier system embodied in the radio of an automobile in which my novel phonograph is mounted.

A switch 191, Figs. 8 and 9, is mounted on a bracket 192 below the top wall 28 of the base B. An elongated lever 194 is pivotally mounted at its central portion by a pin 195 to the top wall 28 in position wherein the inner end portion 194a of the lever 194 projects inwardly into the recess 29 formed in the central portion of the top wall 28, Fig. 7. A push button 197 is slidably mounted on the upper face of the top wall 28 of the base B, Figs. 1, 2 and 8, and has a pin 198 projecting downwardly into the other end portion 194b of the lever 194, Fig. 8. A lever 201 is pivotally mounted on the switch 191 and has an end portion 201a engageable in the forked end 202 of the switching element of the switch 191. The lever 201 has another end portion 201b projecting upwardly into a slot 204 formed in the end portion 194b of the lever 194.

When the button 197 is disposed in the solid line position shown in Fig. 2, the lever 194 is disposed in the position shown in Fig. 6, and the lever 201 is disposed in position wherein the switching element 202 is in "on" position. When it is desired to turn the switch 191 off, the push button 197 may be moved rearwardly from the position shown in solid lines in Fig. 2 into overlying position relative to the rear end portion of the slot 199. This effects clockwise rotation of the lever 201 as viewed in Fig. 9, from the position shown in broken lines in Fig. 9, to thereby move the switching element 202 in a clockwise direction and dispose the switch 191 in "off" position. The switch 191 may be connected by suitable wiring, not shown, to the motor M and the cartridge in the tone arm A, to thereby control the operation of the phonograph 20.

Also, the push button 197 affords a manually operable member for initiating a record changing cycle of operation. Thus, if it is desired to change records, before the completion of the playing of a record, the operator may push the button 197 forwardly from the position shown in solid lines in Fig. 2 to the position shown in broken lines therein. A leaf spring 206 is mounted on the inner portion 194a of the lever 197 in such position that during such movement of the lever 194, the spring 206 engages a pin 208 projecting upwardly from the eccentric wheel 132, Figs. 5 and 7. The spring 206 is of sufficient strength to rotate the wheel 132 in a counterclockwise direction as viewed in Fig. 7 into position wherein the trailing end portion of the recess 135 engages the knurled collar 59 and thereby initiates a record changing cycle of operation. A tension coil spring 208 is connected to the lever 194 and the top wall 28 of the base B in position to urge the lever 194 to rotate in a clockwise direction as viewed in Fig. 7 and, therefore, is effective to hold the spring 206 out of engagement with the pin 208 except when the lever 197 is manually moved forwardly into "record-changing" position.

A mounting bracket MB is provided for my phonograph 20 to mount the latter under the dashboard DB of an automobile, Figs. 1, 2, 3, 5, 6, 16 and 19. The mounting bracket MB embodies an upwardly opening substantially U-shaped housing 211 having substantially parallel upright side walls 213 and 214 and a double panelled lower wall 215. Four spiral springs 217, Figs. 5 and 16, are mounted on the bottom wall 215 by suitable brackets 218, and the housing H of the phonograph 20 is mounted on the springs 217 and secured thereto in spaced relation to the walls 213—215. Two substantially L-shaped bracket members 221 and 222, each having a back leg 221a and 222a and a front leg 221b and 222b, are mounted on the fire wall FW of the automobile, with the back legs 221a and 222a secured in juxtaposition thereto by suitable means such as bolts 224. The legs 221b and 222b project substantially horizontally forwardly from the fire wall FW in spaced parallel relation to each other, and each embodies an elongated slot 226 therein.

Each of the side walls 213 and 214 of the housing 211 have two bolts 228 mounted therein and projecting outwardly through the slot 226 in the mounting brackets 221 and 222, respectively, Figs. 5 and 16. Nuts 299 are mounted on the bolts 228 in position to clamp the legs 221b and 222b against the side walls 213 and 214, respectively, of the housing 211.

The brackets 221 and 222 are so disposed on the fire wall FW and the slots 226 are so disposed therein, that the housing 211 may be slid inwardly along the legs 221b and 222b into position wherein the phonograph 20 is disposed forwardly of the dashboard DB that is, between the firewall FW and the dashboard DB.

When it is desired to change records or to make other adjustments on the phonograph 20 the nuts 229 may be loosened on the bolts 228 and the housing 211 may be slid rearwardly along the brackets 221 away from the fire wall FW into position wherein the spindle S of the phonograph 20 is disposed forwardly of the dashboard DB in position wherein the records may be readily mounted on or removed from the spindle S. During operation of the phonograph 20 the latter may again be disposed in concealed position under the dashboard DB.

In my novel invention, I have afforded a phonograph which is effective and efficient in operation when stationarily mounted, such, as, for example, when mounted on a stand or cabinet in a home, or when movingly mounted, such, as, for example, when mounted in a moving vehicle such as an automobile, or the like, with the vehicle operating under normal road conditions. Under normal driving conditions in a moving vehicle, a phonograph is subjected to vibrations, jolts, and other external forces caused by the movement of the vehicle, which would cause any other phonograph with which I am familiar, to be ineffective to satisfactorily play records or change records. With my invention, I have afforded a phonograph which tests have shown is operable to effectively play records and change records while the phonograph is mounted in an automobile being driven under extremely adverse driving conditions, including driving at high speeds around curves and turns, at high and low speeds over extremely rough roads, and being subjected to jolts and shocks which were considerably more severe than any driving conditions to which an automobile, or like vehicle, is normally subjected.

One such effectively operating phonograph, constructed in accordance with the principles of my invention, included a tone arm A having a construction, diagrammatically illustrated in Fig. 20, wherein the horizontal projection AA of the overall length of the tone arm disposed in horizontally extending position is 16.3 cm., with the projection AA measured along the vertical plane perpendicular to the longitidiunal axis of the horizontal pivot 144; the center of gravity $CG_1$ of the portion $A_1$ of the tone arm A, disposed forwardly of the axial center line of the horizontally disposed pivot pin 144, is disposed forwardly of that center line a horizontal distance $L_1$, along the aforementioned projection plane, equal to 6.08 cm.; the center of gravity $CG_2$ of the portion $A_2$ of the tone arm A, disposed rearwardly of the axial center line of the horizontal pivot pin 144, is disposed rearwardly of the axial center of the pin 144 a horizontal distance $L_2$, along the projection plane, equal to 1.59 cm.; the record-engaging end of the needle 24 is disposed forwardly of the axial center line of the pin 144 a horizontal distance $L_3$, along the projection plane, equal to 12.1 cm.; the horizontally extending lines through the centers of gravity $CG_1$ and $CG_2$, which are parallel to the projected length AA of the tone arm A, are horizontally spaced from each other a distance of 1.83 cm.; the axial center line of the spring 155 is disposed horizontally rearwardly of the axial center line of the pin 144, a horizontal distance $L_{13}$, along the projection plane, equal to 2.22 cm.; the total weight of the tone arm is 56 grams; the weight of the portion $A_1$ of the tone arm A is 16 grams; the weight of the portion $A_2$ of the tone arm A is 40 grams; and the spring 155 pushes vertically upwardly on the rear end portion of the tone arm $A_2$ with a force $F_{13}$ of 121 grams.

The construction of this same tone arm $A_1$ referred to the axial center of the vertical pivot 146 is diagrammatically shown in Fig. 21. As there illustrated, the center of gravity $CG_3$ of the portion $A_3$ of the tone arm A, disposed forwardly of the longitudinal axis of the vertical pivot 146, is disposed forwardly of the pivot 416 a distance having a horizontal projection $L_4$, lying in the vertical plane through the longitudinal axis of the pivot 146 and perpendicular to the longitudinal axis of the horizontal pivot 144, equal to 6.56 cm.; the center of gravity $CG_4$ of the portion $A_4$ of the tone arm A, disposed rearwardly of the vertical axis of the pivot pin 146, is disposed rearwardly of the vertical axis of the pivot 146 a horizontal distance $L_5$, along the last mentioned projection plane, equal to 2.4 cm.; the vertical axis of the vertical pivot 146 is disposed forwardly of the horizontal axis of the horizontal pivot 144 a horizontal distance $L_7$, along the last mentioned projection plane, equal to 1.0 cm.; the record-engaging end of the needle 24 is disposed forwardly of the axis of the vertical pivot 146 a horizontal distance $L_6$, along the last mentioned projection plane, equal to 11.1 cm.; the lines extending horizontally through the centers of gravity $CG_3$ and $CG_4$ in parallel relation to the last mentioned projection plane are spaced apart a horizontal distance $L_8$, equal to 2.06 cm.; the horizontal straight line distance $L_9$ from the record-engaging end of the needle 24 to the closest point on the axis of the vertical pivot 146 is equal to 11.4 cm.; the weight of the portion $A_3$ of the tone arm A is 15 grams; and the weight of the portion $A_4$ of the tone arm A is 41 grams.

In this same phonograph, the wheel 132 has a weight of 14 grams, and, as diagramamtically illustrated in Fig. 22, the spring 137 engages the ear 139 a horizontal distance $L_{10}$ from the vertical axis of the pin 133 equal to 2.22 cm.; the center of gravity $CG_5$ of the wheel 132 is disposed on a line which projects from the vertical axis of the pin 133 at an angle $\phi$ from the line $L_{10}$ in the direction of rotation of the wheel 132, with the angle $\phi$ equal to 18°, and with the center of gravity $CG_5$ being disposed along this latter line a distance $L_{11}$ from the axial center of the pin 133 equal to .64 cm.; the horizontal distance $L_{12}$ from the point at which the lever 163 engages the ear 139 to the longitudinal axis of the vertical pivot 146 is equal to 7.0 cm.; and the force necessary to be applied by the ear 139 against the spring 137 to overcome the spring 137 and thereby permit rotation of the wheel 132 into position wherein the trailing edge of the recess 135 engages the collar 59 is equal to 25 grams.

I have found that with the phonograph 20 constructed in such a manner, it is efficient and effective in operation, both in changing and playing records, even when mounted in an automobile, or the like, being driven under the aforementioned adverse driving conditions. In my novel phonograph, the tone arm A is effectively held against being thrown upwardly off from, or horizontally across, a record being played, by even the aforementioned abnormal forces applied thereto; the record-changing mechanism is effectively restrained from accidental initiation of a record-changing cycle of operation, but is effective to change records when initiated in the normal manner; and the needle rides in the record-playing groove in a manner effective to "play" the records without an impractical amount of wear on the record groove, or the needle, and without undesirable slipping occurring between the record being played and the underlying turntable, even when several records are present on the turntable.

It will be understood, of course, that the foregoing specific construction of the phonograph 20 is set forth merely by way of illustration and that specific changes may be made therein without departing from the purview of my invention.

As is diagrammatically illustrated in Figs. 24 and 25, the record groove RG of a record 22, to be played on the phonograph 20, is of such a cross-sectional shape that the side walls thereof diverge from each other at an angle $\theta$. The needle 24, in "playing" the record, rides in the groove RG in contact with the opposite side walls such as at X and Y.

The needle 24 is normally held downwardly into the groove RG, during playing of the record 22, with a force $F_V$, Figs. 24 and 25. The downward force $F_V$ of the needle 24 causes an outward force to be applied to the sidewalls of the groove RG at both X and Y, perpendicular to the side wall of the groove RG at those points. This outward force is considered herein to be a force $F_S$ whether it is applied to the side walls of the groove RG at either X or Y. This outward force results in a positive horizontal force $F_H$ being applied to the side wall at X or Y by the needle 24, with, of course, an equal and opposite force being applied by the side wall to the needle 24 at those points.

Another result of the needle 24 being held downwardly into the groove RG by the force $F_V$ is that a frictional force FF, parallel to the sidewall of the groove RG in all directions, and tending to restrain movement of the needle 24 along the sidewalls in any direction parallel thereto, is set up at both X and Y. This force FF is equal to the product of the force $F_S$ multiplied by the coefficient of friction C between the needle 24 and the sidewalls of the groove RG. This has its good and its bad features. One of the bad features of the force FF is that it exerts "drag" on the record being played which must be overcome to permit the record being played to rotate with the turntable without slipping relative thereto. One of the good features of the force FF is that it affords another force tending to prevent the needle 24 from moving out of the groove RG. This latter force has a horizontal component indicated as $FF_H$ in Fig. 25.

Hence, under these conditions, the needle 24 is held against movement laterally across the groove RG in either horizontal direction by a horizontal force $F_T$ which is equal to the sum of the force $F_H$ and the force $FF_H$.

As is diagramatically illustrated in Fig. 23, when a record 21 having a weight $W_R$ is mounted in playing position on the phonograph 20, the weight $W_R$ may be considered as pressing down on the underlying surface at a distance $L_{14}$ from the center of rotation of the record 21; the needle 24 presses down on the record 21 with a vertical force $F_V$ at a distance $L_{16}$ from the center of rotation of the record 21; and these two forces $W_R$ and $F_V$ result in what may be called a total vertical force $F_T$ applied by the record 21 to the underlying supporting surface which may be considered as applied a distance $L_{15}$ from the center of rotation of the record 21.

In a tone arm mounted for horizontal and vertical rotation around vertical and horizontal pivots, the tone arm has what may be called an effective weight disposed at what may be termed an effective point disposed at a distance, which may be termed the effective length from the pivot. For example, with the tone arm A constructed as previously described, the effective weight EW thereof, considered with reference to the horizontal pivot 144, is either the sum or the difference of the weights of the portions $A_1$ and $A_2$, depending on whether the conditions for which the effective weight is being calculated is such that the portions $A_1$ and $A_2$ tend to add to each other or balance each other. The effective length of the tone arm A is then such that the product of the effective weight EW multiplied by the effective length EL is equal to the sum of the product of the weight of the portion $A_1$ multiplied by the lever arm $L_1$ plus the product of the weight of the portion $A_2$ multiplied by the lever arm $L_2$ with the last mentioned products being both considered positive, or one positive and one negative, depending on whether the conditions were such that the last mentioned weights tended to add to each other or balance each other, respectively. When considering the tone arm A with respect to the vertical pivot 146, for the purpose of determining the amount and location of the effective weight, it is necessary to consider the entire tone arm assembly including all the members, such as, for example, the lever 181, which are attached to, and rotate with the tone arm A as an assembly. This effective weight $E'W'$ is different from the effective weight $EW$ for the tone arm A, and the effective length $E'L'$ therefor is measured from the longitudinal axis of the vertical pivot 146, rather than from the horizontal pivot 144 as was the first mentioned effective weight EL.

The theory which I believe to be the correct theory of operation of a phonograph constructed in accordance with the principles of my invention is that with the tone arm of a phonograph, such as the phonograph 20, pivoted for both vertical and horizontal movement at its center of percussion with reference to the record-engaging portion of the needle, the forces, tending to dislodge the needle from record-playing engagement with a record being played, created by bumps, jolts, vibrations and other forces exerted on the phonograph by the operation of the vehicle, may be eliminated or reduced. Center of percussion may be defined as that point in a body free to move about a fixed axis at which the body may be squarely struck without jarring the axis. Hence, the fixed axis of a tone arm with reference to which the center of percussion is calculated in accordance with the above set forth theory would be the point at which the needle of the tone arm engaged the record when in playing position. However, in accordance with my aforementioned theory, which I believe to be correct, whether the tone arm is pivoted at the aforementioned center of percussion, or not, to insure that the phonograph will effectively play and change records in a moving vehicle:

(1) The vertical force $F_V$ on the needle 24 should not be less than $$\frac{F_{TH} 2 \tan \frac{\theta}{2}}{1 + C \tan \frac{\theta}{2}}$$

where:

$F_{TH}$ = total maximum horizontal force to be applied to the record engaging portion of the needle tending to dislodge the needle from the groove of the record without causing the tone arm to swing across the record grooves;

$\theta$ = the vertically opening angle defined by the side walls of the record grove; and C = the coefficient of friction between the needle and the side walls of the record groove.

(2) The vertical force $F_{13}$ exerted by the spring 155, or the like, in a direction to prevent the tone arm from rotating around its horizontally disposed pivot in a needle-raising direction should not be less than $$EL \frac{\left(\frac{EW}{g}a - EW\right)}{L_{13}}$$

where:

EL = the effective length of the tone arm with reference to the horizontally disposed pivot;

$\frac{EW}{g}$ = the effective mass of the tone arm tending to hold the needle engaged with the record being played;

$a$ = the maximum vertical acceleration, in a direction tending to lift the tone arm, to which the tone arm is to be subjected without raising;

EW = the effective weight of the tone arm; and $L_{13}$ = the horizontal distance of the vertical force $F_{13}$ from the horizontal pivot of the tone arm along a line perpendicular to the longitudinal axis of the horizontal pivot.

(3) The vertical force $F_V$ of the needle 24 on the record 21 being played is less than $$\frac{2F_{15}L_{15}C'\left(\sin\frac{\theta}{2}\right)}{CL_{16}}$$

where:

$F_{15}$=the total vertical force applied by the record being played to the underlying supporting surface therefor;
$L_{15}$=the effective distance of the force $F_{15}$ from the center of rotation of the record 21;
$C'$=the coefficient of friction between any of the supporting surfaces supporting the record being played;
$\theta$=the vertical angle defined by the side walls of the record groove;
$C$=the coefficient of friction between the needle and the side walls of the record groove; and
$L_{16}$=perpendicular distance of the force $F_V$ from the center of rotation of the record.

(4) The restraining force $F_{10}$ exerted by the spring 137 or the like, on a point on the wheel 132 in a direction to prevent the trailing edge of the recess 135 from engaging the collar 59 is greater than $$\frac{\frac{W_{11}}{g}a'L_{11}}{L_{10}}$$

where:

$\frac{W_{11}}{g}$=the mass of the wheel 132;
$L_{11}$=the horizontal distance of the center of gravity of the wheel 132 from the longitudinal axis of the vertical pivot 133;
$a'$=the maximum horizontal acceleration to which the wheel 132 is to be subjected perpendicular to the line along which the distance $L_{11}$ is measured and in a direction of rotation of the wheel 132 opposite to the direction in which the spring 137 acts thereon; and
$L_{10}$=the horizontal distance from the aforementioned longitudinal axis of the pivot 133 to the point at which the force $F_{10}$ is applied to the wheel 132.

(5) The horizontal force $F_E$ exerted by the spring 184, or the like is greater than $$\frac{E'L'\left(\frac{E'W'}{g}a''\right)}{L_E}$$

where:

$\frac{E'W'}{g}$=the effective mass of the tone arm assembly movably mounted on the vertical pivot 146;
$E'L'$=the effective horizontal distance of the effective weight $E'W'$ of the tone arm assembly from the longitudinal axis of the vertical pivot 146;
$a''$=the maximum horizontal acceleration of the tone arm assembly perpendicular to the lever $E'L'$ in a direction tending to cause rotation of the tone arm assembly in the opposite direction from the urging of the force $F_E$; and
$L_E$=the horizontal distance from the longitudinal axis of the vertical pivot 146 to the point at which the horizontal force $F_E$ is applied perpendicular to the lever arm $L_E$.

According to my determinations, in a phonograph constructed in accordance with the principles of my invention, the needle 24 should be urged toward the record 21 being played, when the phonograph is stationarily disposed in normal position, with a force not less than results from calculating it with the aforementioned formula $$\frac{F_{TH}2\tan\frac{\theta}{2}}{1+C\tan\frac{\theta}{2}}$$

where $F_{TH}$ is the horizontal force which would be caused to be exerted on the needle 24 when it is so engaged with said groove when the phonograph was accelerated at a rate of eleven feet per second per second in any horizontal direction, including the horizontal direction to produce the greatest resulting force $F_{TH}$ on the needle. The maximum downward force which may be applied to the needle can not be greater than that which will cause slippage of the record being played relative to the turntable or, in other words should be less than the force calculated by the aforementioned formula $$\frac{2F_{15}L_{15}C'\left(\sin\frac{\theta}{2}\right)}{CL_{15}}$$

When my novel phonograph is so constructed it affords a practical record-player and record-changer for operation in moving automobiles, and the like.

With a phonograph constructed in accordance with the principles of my invention I have found that it continues to effectively play records and to change records when mounted in an automobile and with the automobile being driven under road and driving conditions much more adverse to proper operation of the phonograph than the phonograph would be subjected to under normal road and driving conditions. These adverse conditions included driving at low speeds, high speeds and intermediate speeds: over rough and bumpy roads; over straight and level roads; up hill; down hill; and around curves and sharp turns. They also included accelerating and decelerating at low, high and intermediate rates.

From the foregoing it will be seen that I have afforded a novel phonograph for use in automobiles, and the like, which is effective and efficient in operation.

Also, I have afforded such a phonograph wherein the parts thereof may be protected against accidental breakage by affording yielding driving and holding connections which are constituted and arranged in a novel and expeditious manner to afford protection against such breakage while still affording a novel and practical record-player and record-changer for use in moving vehicles such as automobiles, and the like.

In addition it will be seen that I have afforded a novel record-player and record-changer of the aforementioned type which may be readily and economically produced commercially.

Thus, while I have illustrated and described the preferred embodiment of my invention, it is to be understood that this is capable of variation and modification.

I claim:

1. A phonograph comprising a turntable for supporting a record disk to be played in substantially horizontally extending position, means for rotating said turntable and thereby rotating such a record mounted on said turntable, record-playing means pivotally mounted for horizontal and vertical pivotal movement relative to said turntable in position to playingly engage said record on said turntable, said record-playing means being pivotally mounted for said horizontal and vertical pivotal movement at the horizontal and vertical center of percussion thereof, respectively, from said engagement of said record-playing means with said record.

2. A combination record-player and record-changer for playing disk records having an elongated record groove therein comprising a turntable normally disposed in position to support such a record in horizontally extending position, means for rotating said turntable and thereby rotating said record horizontally, a tone arm assembly including an elongated tone arm, a record-engaging needle in one end of said tone arm, means pivotally supporting said tone arm for horizontal rotation, means including said last named means for pivotally supporting said tone arm for vertical rotation, and means yieldingly urging said tone arm to pivot vertically around said first mentioned pivot means in a direction to urge said needle toward said record when said needle is disposed over said record, means engaged with said tone arm assembly for pivoting said tone arm upwardly into raised position relative to said record and swinging said tone arm horizontally across said record in said raised position, said last named means including a slide engaged with said tone arm assembly and reciprocable relative thereto, means including an eccentric for reciprocating said slide, said eccentric having a normal position and a driving position, and a spring engaged with said eccentric and yieldingly holding said eccentric from moving to said driving position when said eccentric is disposed in said normal position, and means comprising said tone arm assembly for releasing said eccentric from said spring and moving said eccentric from said normal position to said driving position, said yieldingly urging means in said tone arm assembly urging said tone arm to pivot in said direction with such a force that said needle is pressed against the side walls of said groove, when said needle is disposed in said groove and the phonograph is stationarily disposed in normal position, with a force greater than the product of the horizontal force which would be applied to said needle by the acceleration of the phonograph at a rate of 11 feet per second per second in the horizontal direction which would cause the greatest force to be applied to said needle, when said needle is disposed in said groove and said tone arm assembly is moving said eccentric from said normal position to said driving position, multiplied by $$\frac{2 \tan \frac{\theta}{2}}{1 + C \tan \frac{\theta}{2}}$$

where $\theta$ is the angle at which said side walls diverge from each other, and C is the coefficient of friction of the supporting and driving surface between said record and said turntable.

3. In a combination record-player and record-changer for playing record disks having an elongated record groove therein in moving automobiles, a turntable for rotatably supporting such a disk in playing position, pick-up means pivotally mounted for swinging movement in a vertical direction between raised and lowered position, and in a horizontal direction between inwardly and outwardly disposed positions, and means for holding said pick-up means against being horizontally swung by movement of such an automobile when said pick-up means are disposed in said raised and lowered positions, said holding means including spring means yieldingly holding said pick-up means against such horizontal swinging movement when said pick-up means are disposed in said raised position, and spring means yieldingly holding said pick-up means in engagement with the side walls of said groove, when said pick-up means are disposed in said lowered position, with a force perpendicular to said face of said record which is not less than the product of the force which would be applied to said pick-up means by the acceleration thereof in a direction parallel to said face of said record at a rate of 11 feet per second per second multiplied by $$\frac{2 \tan \frac{\theta}{2}}{1 + C \tan \frac{\theta}{2}}$$

where $\theta$ is the angle at which said side walls diverge from each other, and C is the coefficient of friction between the engaging portions of said disk and said pick-up means, and which perpendicular force is less than $$\frac{2FLC' \sin \frac{\theta}{2}}{CL'}$$

where F is the force applied by the record directly against the supporting surface therefor, L is the effective distance of the force F from the center of rotation of said disk, C' is the coefficient of friction between said record and said supporting surface therefor, and L' is the distance from said perpendicular force to said center of rotation measured perpendicularly to the latter.

4. In a combination record-player and record-changer for use in automobiles for playing a substantially flat record disk having a center of rotation and having a sound groove in one face thereof around said center of rotation, a turntable for supporting such a record for rotation around said center of rotation with said face facing away from said turntable, means for rotating said turntable and thereby rotating said disk around said center of rotation, and a tone arm assembly, said assembly including a record-engaging member pivotally mounted for pivotal movement horizontally across said disk in parallel relation thereto and vertically toward and away from said disk, and means for holding said tone arm assembly from being swung horizontally or vertically by movement of such automobile when said record-engaging member is disposed in any position, said last named means including spring means operatively connected to said tone arm assembly when said record-engaging member is disposed out of engagement with said disk for holding said tone arm assembly from being so swung when said record-engaging member is disposed out of engagement with said disk, and spring means yieldingly holding said member against the side walls of said groove, when said member is engaged with said disk, with a force, perpendicular to said face, which is not less than the product of the maximum force which would be applied to said tone arm assembly in any direction parallel to said face by the acceleration of said tone arm assembly in said direction at a rate of 11 feet per second per second, multiplied by $$\frac{2 \tan \frac{\theta}{2}}{1 + C \tan \frac{\theta}{2}}$$

where $\theta$ is the angle at which said side walls diverge from each other, and C is the coefficient of friction between the engaging portions of said record-engaging member and said side walls, and which perpendicular force is less than $$\frac{2FLC' \sin \frac{\theta}{2}}{CL'}$$

where F is the force applied by the record perpendicularly against the supporting surface therefor when said tone arm assembly is so engaged with said record, L is the effective distance of said force F from said center of rotation, C' is the lowest coefficient of friction between surfaces supporting and frictionally driving said disk during said rotation thereof, and L' is the distance from said first mentioned perpendicular force to said center of rotation measured perpendicularly to the latter.

5. In a combination record-player and record-changer for use in automobiles for playing a substantially flat record disk having a center of rotation and having a sound groove in one face thereof around said center of rotation, a turntable for supporting such a record for rotation around said center of rotation with said face facing away from said turntable, means for rotating said turntable and thereby rotating said disk around said center of rotation, a tone arm assembly, said assembly including a record-engaging member pivotally mounted for pivotal movement horizontally across said disk in parallel relation thereto and vertically toward and away from said disk, and means for holding said tone arm assembly from being swung horizontally or vertically by movement of such automobile when said record-engaging member is disposed in any position, said last named means including spring means yieldingly holding said member against the side walls of said groove with a force, perpendicular to said face, which is not less than the product of the maximum force which would be applied to said tone arm assembly in any direction parallel to said face by the acceleration of said tone arm assembly in said direction at a rate of 11 feet per second per second, multiplied by $$\frac{2 \tan \frac{\theta}{2}}{1 + C \tan \frac{\theta}{2}}$$

where $\theta$ is the angle at which said side walls diverge from each other, and C is the coefficient of friction between the engaging portions of said record-engaging member and said side walls, and which perpendicular force is less than $$\frac{2FLC' \sin \frac{\theta}{2}}{CL'}$$

where F is the force applied by the record perpendicularly against the supporting surface therefor when said tone arm assembly is so engaged with said record, L is the effective distance of said force F from said center of rotation, C' is the lowest coefficient of friction between surfaces supporting and frictionally driving said disk during said rotation thereof, and L' is the distance from said first mentioned perpendicular force to said center of rotation measured perpendicularly to the latter, and means for moving said record-engaging member across said face, said means for moving including a driving member eccentrically mounted for intermittent rotation by said turntable, said driving member having a driving position and another position, and latching means mounted on said supporting means in position to engage said driving member and yieldingly hold said driving member in said other position against said rotation thereof into said driving position with a force greater than the force applied to said driving member by the acceleration thereof in the direction of rotation from said other position toward said driving position at the rate of 11 feet per second per second.

References Cited in the file of this patent

UNITED STATES PATENTS

| | | |
|---|---|---|
| 2,224,332 | Alsbrook | Dec. 10, 1940 |
| 2,331,122 | Jones | Oct. 5, 1943 |
| 2,331,383 | Faulkner | Oct. 12, 1943 |
| 2,426,978 | Alexanderson | Sept. 9, 1947 |
| 2,506,692 | Thompson | May 9, 1950 |
| 2,539,784 | Kleber | Jan. 30, 1951 |
| 2,636,742 | Redfield | Apr. 28, 1953 |